(12) United States Patent
Walker

(10) Patent No.: US 7,445,008 B1
(45) Date of Patent: Nov. 4, 2008

(54) WALKER WEDGE

(75) Inventor: Brock M Walker, Okemos, MI (US)

(73) Assignee: Dr. Brock Walker, Okemos, WI (US)

( * ) Notice: Subject to any disclaimer, the term of this patent is extended or adjusted under 35 U.S.C. 154(b) by 0 days.

(21) Appl. No.: 09/390,625

(22) Filed: Sep. 7, 1999

(51) Int. Cl.
*A61G 15/00* (2006.01)

(52) U.S. Cl. .......................... 128/845; 128/869; 602/19

(58) Field of Classification Search ......... 128/845–846, 128/869, 870, 882; 602/5, 19; 297/460; 5/652–654, 630
See application file for complete search history.

(56) References Cited

U.S. PATENT DOCUMENTS

| | | | | |
|---|---|---|---|---|
| 4,475,543 A | * | 10/1984 | Brooks | 602/19 |
| 4,572,578 A | * | 2/1986 | Perkins | 297/452.32 |
| 4,597,386 A | * | 7/1986 | Goldstein | 602/19 |
| 4,752,067 A | * | 6/1988 | Colonello | 272/93 |
| 5,201,761 A | * | 4/1993 | Serola | 606/240 |
| 5,452,728 A | * | 9/1995 | Iams | 128/845 |
| 5,452,940 A | * | 9/1995 | Maier | 297/452.32 |
| 5,547,251 A | * | 8/1996 | Axelson | 297/284.5 |
| 5,626,616 A | * | 5/1997 | Speece | 606/240 |
| 6,041,457 A | * | 3/2000 | Summers | 5/630 |
| 6,125,851 A | | 10/2000 | Walker et al. | |
| 6,532,962 B1 | | 3/2003 | Walker et al. | |

\* cited by examiner

*Primary Examiner*—Michael Brown
(74) *Attorney, Agent, or Firm*—Alejandro J. Fernandez; Broad and Cassel

(57) ABSTRACT

A cushion for use with a variety of types of seats, for example, automotive seats, to adjust the sacrum thereby pivoting the pelvis to assist in maintaining the spine in equilibrium. The cushion is preferably separate from the seat and has central and end support areas that have a density or compressibility that is greater than that of the interconnecting portions. The central area is also provided with one of a plurality of inserts that individually have varying compressibility so that the compressibility of the central area is variable by changing between the inserts.

31 Claims, 10 Drawing Sheets

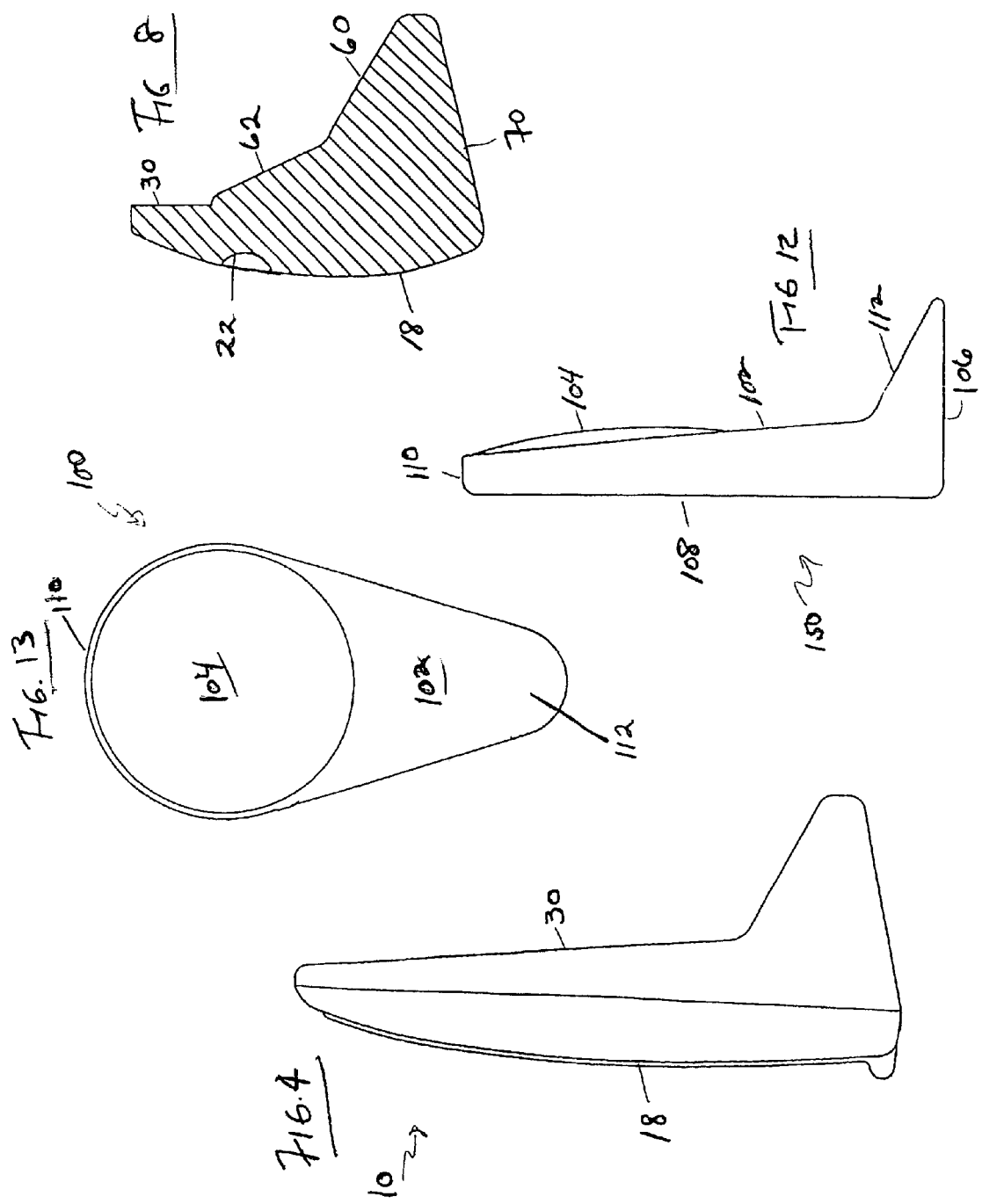

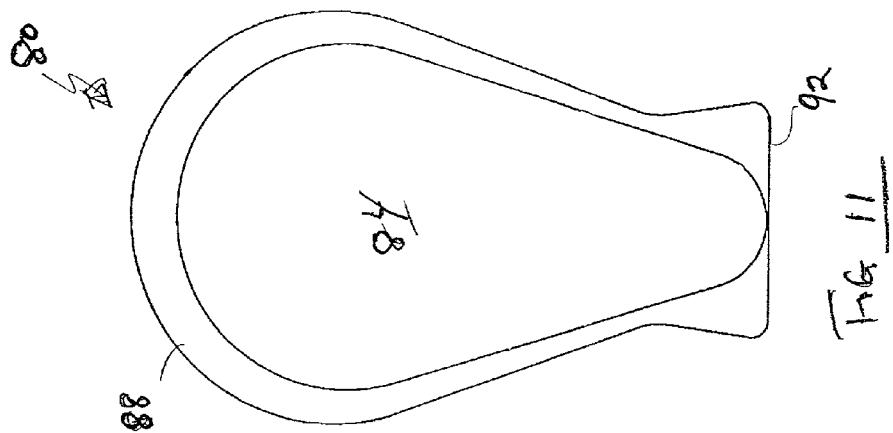
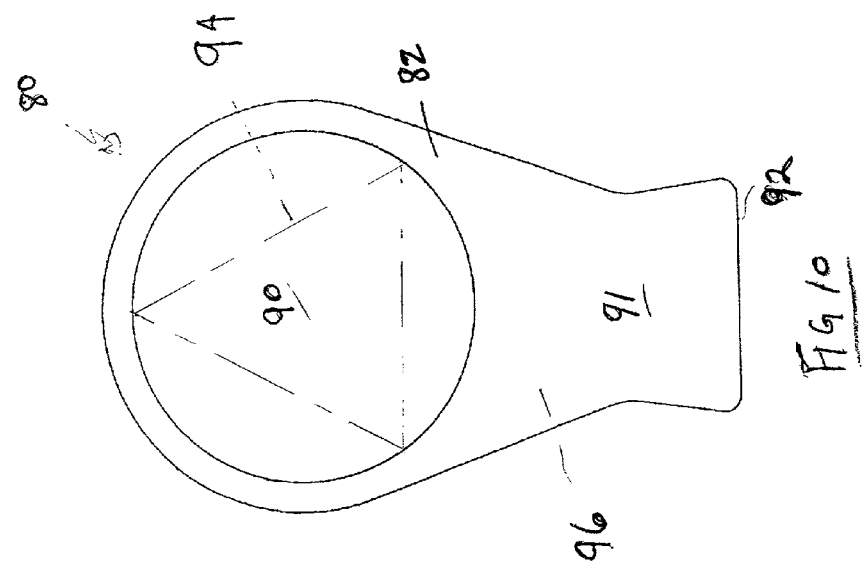
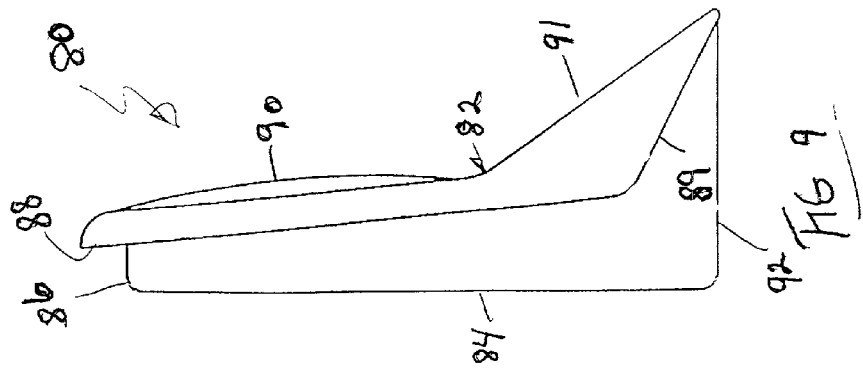

WALKER WEDGE

BACKGROUND OF THE INVENTION

1. Field of the Invention

The present invention relates to a spine orienting device for use with a variety of types of seats, for example, automotive seats or office type seating, in order to properly position the sacrum, which in turn will properly position the spine of the individual using the seat. The spine orienting device, preferably made from foam, can include a plurality of interchangeable inserts, each having differing densities, or a device that could, by itself, provide a variety of variable compression results. Through the use of such inserts or devices, a user can use the device by itself or select one insert, or perhaps more than one insert, most suited to the user and the seat to provide a compression result that will provide sufficient pressure concentrate on the sacrum of the user to properly position the sacrum. The device will also fill an otherwise empty space between the bottom and rear seat sections, thereby further improving posture while seated.

2. Background of the Present Invention

Many types of spine supporting devices have been suggested. Primarily these have ranged from those that extend across the whole lumbar region to others that extend upwardly to fit against the upper back. Such devices have usually been in the form of a pillow or a shaped seat that will tend to fit the curvature of the lumbar region of a person's spine when seated in that seat.

In this regard, attention is directed to a co-pending application Ser. No. 08/289,372, entitled SPINAL SUPPORT SYSTEM FOR SEATING, which is hereby incorporated by reference, and suggested use of specific force directed against the sacrum. Other examples of prior art devices are set forth in this co-pending application.

SUMMARY OF THE PRESENT INVENTION

It was found that with many types of seating, for example, automotive seats, there is usually a relatively large gap between the posterior of the seat user and the area where the bottom and back portions of such seats join or are connected together. When the sacral area of the seat user remains unsupported it was found that fatigue, back pain and other related problems that might otherwise develop could be avoided through use of a portable device that would work with a variety of seat types. Further, because individuals vary widely in terms of their total body weight, their frame size, and the amount of support necessary to achieve some measure of relief, the support device would need to be adjustable to each individual and to each seating environment.

This invention achieves those requirements. The invention is a molded foam spinal support device that is easy to use, provides the ability to produce the desired isolated force on the sacrum, yet permits easy adjustment of the level of compressibility of the foam. Additionally, the present invention also achieves its effectiveness in being able to correctly position a user's sacrum in a variety of types of seats.

The molded device includes a main body, having a central portion and outwardly directed wing portions. The main body can be used by itself or with one of a number of inserts, each offering varying degrees of increasing density and thickness. As inserts having increasing density are used within the central portion of the main body, that central area of the main body where the selected insert is placed will become less and less compressible. This progressively increases the force that can applied to the user's sacrum, thereby resulting in increasing levels of support for the sacrum. The desired level for such an applied, and isolated, force should be enough to properly position the sacrum, yet not so much as might result in pain or discomfort to the user. The proper level of compression or density will that which will make the support device virtually disappear as an additional seat component. Additionally, the main body is designed to permit those portions of the body adjacent the sacrum to be relatively less supported. While the sacrum itself needs to be supported, the adjacent body structure will desirably be able to move rearwardly, or fall back, by an amount needed to achieve the desired level of pelvic pivot to properly orient the spine.

Other objects, features, and characteristics of the present invention will become apparent upon consideration of the following description in the appended claims with reference to the accompanying drawings, all of which form a part of the specification, and wherein like reference numerals designate corresponding parts in the various figures.

BRIEF DESCRIPTION OF THE DRAWINGS

FIG. 4 is a side elevational view of the present invention;

FIG. 8 is a cross-sectional view taken along line 8-8 in FIG. 1;

FIG. 9 is a side elevational view of an insert for use with the device shown in FIG. 1;

FIG. 10 is a front elevational view of the insert shown in FIG. 9;

FIG. 11 is a rear elevational view of the device shown in FIGS. 9 and 10;

FIG. 12 is a side elevational view of an alternative flush mounted insert for use with the device shown in FIG. 1;

FIG. 13 is a front elevational view of the insert shown in FIG. 12;

DETAILED DESCRIPTION OF THE PRESENT INVENTION

Figure 1:
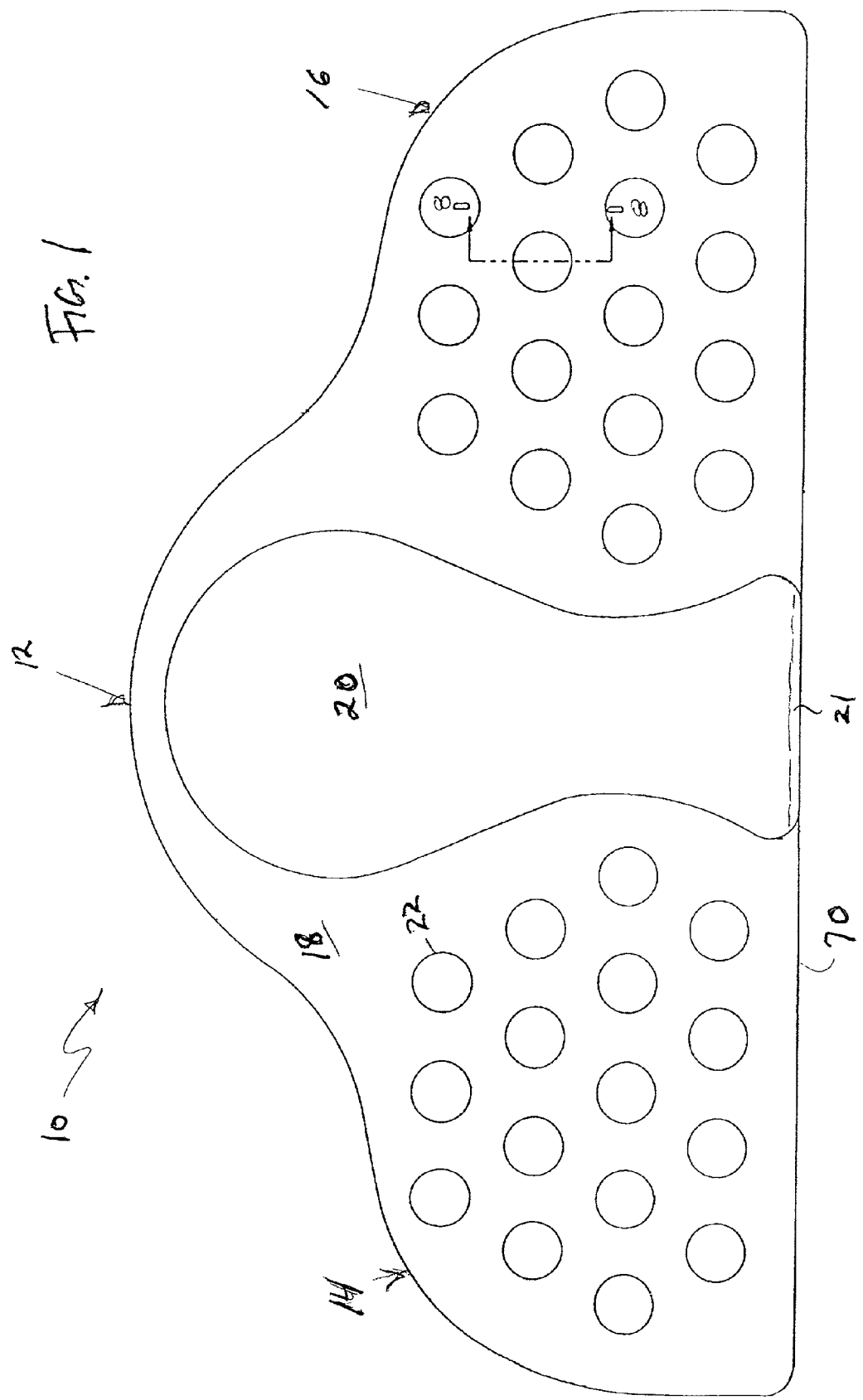
FIG. 1 is a front elevational view of the present invention.

Turning to the drawings, principally FIGS. 1-4, the main body of the support device, generally shown at 10, includes a central area 12, left and right end or wing areas 14 and 16, respectively, and a bottom 70. It is preferred that the support device be a molded product that is formed from one of a number of conventional molding techniques. The front face 18 is formed to have a vertically and horizontally extending curvature, and includes a raised or protruding area 20 provided as the main part of the front surface in the central area 12. The front surface of each of the left and right areas 14 and 16, located on either side of the raised area 20, include a plurality of dimples or recesses 22. These dimples are provided to not only aid in making the front surface non-slip, but to make the device comfortable in use and to control the level of compression of the foam material. Such a recess 22 is shown in FIG. 8 with a depth of about 0.15 inches and a diameter of about 0.2 to about 1.0 inches.

The dimples or recesses 22 could also be provided in the form of through holes. Where through holes are used, they could be the source of cooling airflow, from behind the device, and depending upon their size, they could also provide a way to regulate the compression built into the device. For example, a stiffer material could be employed and with relatively large size holes, the compression and thus the force applied to the sacrum could be regulated. Further, hole spacing could also assist in creating a desired compression with hole location being determined to achieve the desired stiffness at particular locations in view of the stiffness of the material used for molding the device.

It should be understood that the front face 18 could also be formed with other surface configurations, including a smooth surface, or with recesses having a different shape than that shown, such as square or oval, or even a variety of differing shapes. In addition, it is also possible to use holes that either penetrate through the thickness of the material forming device 10, or extend a desired distance into that material. This will provide another way to vary the density and compression offered by the material and a way to tune the compressive support provided by various areas of the support device. It is also possible to form portions of the support device from different material densities so that varying levels of support can be incorporated directly into the molded device.

The support device 10 could also be covered, fully or in part, with a covering material including textile materials, such as, for example, synthetic or natural materials or combinations thereof, leather, rubber, a blended or formed surface material, or a painted on surface. Such material could be applied within the mold, during the molding process, or by a separate procedure following molding. It is also contemplated that the surface of bottom 70, and possibly also the rear surface 30, can be treated and made slightly abrasive. This can be accomplished, for example, by applying a coating of an abrasive coating material, by applying a stiff or skid resistant fabric, or by roughening the bottom surface, either separately or in conjunction with one of the above treatments. This treatment of the bottom 70, and of the rear surface 30 where that is also done, helps to hold the support device in place on the seat so that it will not slip.

The support device 10 is approximately 11½ inches long although the size could range from about eight inches to about twenty inches. The height of the support device will vary from about 4 inches to 6 inches, with the preferred height being about 5½ inches.

With reference to FIGS. 2-4 and 5, the rear view of the support device 10 shows that the rear surface 30 has a slightly tapered slope. The tapering of this surface 30 not only assists in mold release, but also provides a proper fit with many varying types of seats, especially automotive seating. This provides the ability for this support device to develop the desired unification of the occupant's anatomy with the seat being used thereby producing the desired support in all aspects of positions.

Included on the back side of this support device 10 is a recess or hollowed area, generally indicated at 32, that preferably has, for example, an inverted egg shape, although other shapes can be used. This same shape is mirrored by the shape of the raised area 20 on the front surface.

Figure 2:
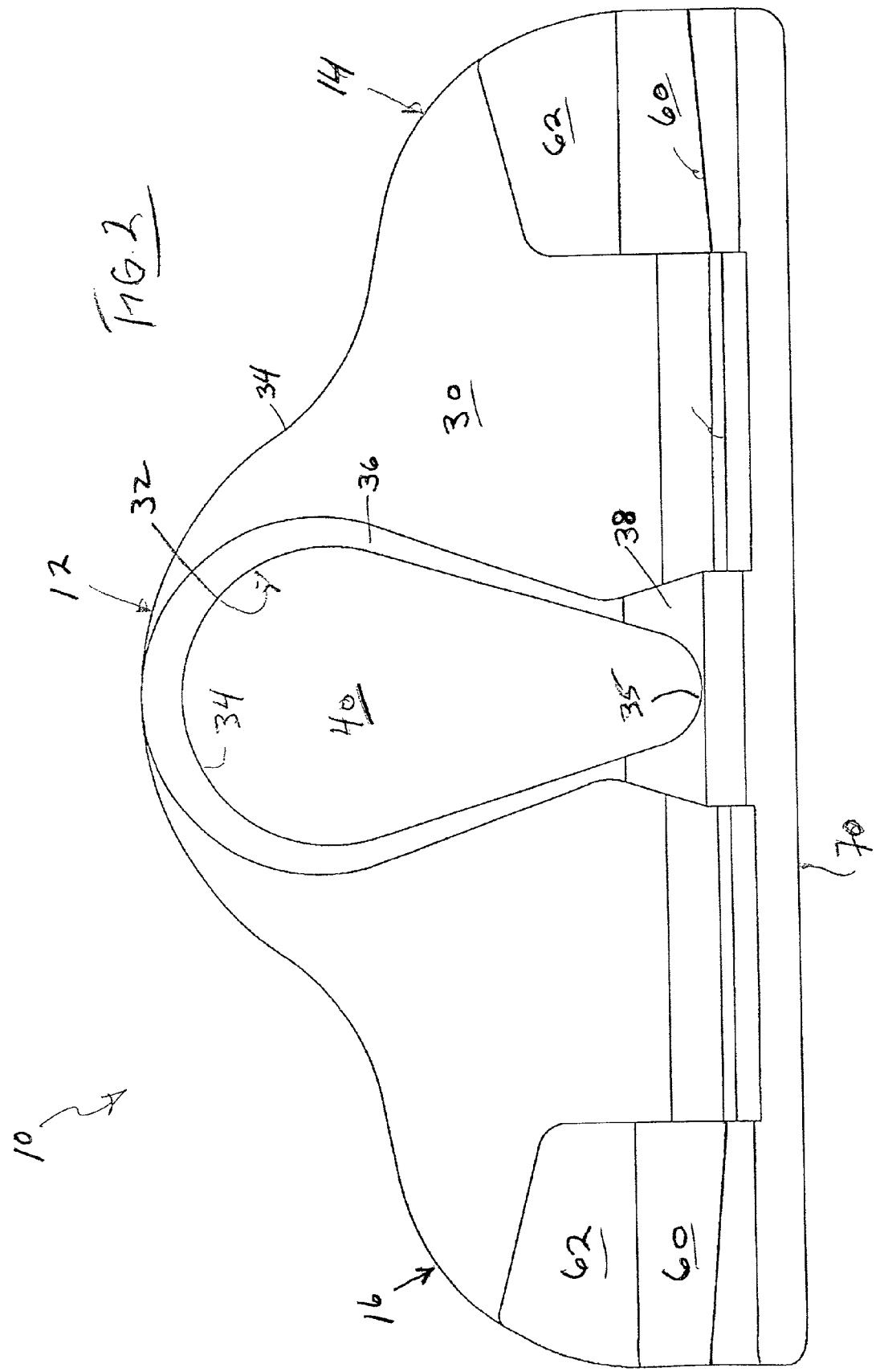
FIG. 2 is a rear elevational view of the device shown in FIG. 1.

Recess 32 preferably has a larger upper portion, positioned adjacent the top edge 34, and a smaller lower portion adjacent the bottom edge 35. The depth and shape of recess 32 is defined by a collar 36 that projects outwardly from rear surface 30 and preferably extends completely around the periphery of recess 32. The bottom portion of each side of collar 36 terminates in and forms a rearwardly and downwardly extending ramp 38 as is shown in FIG. 2. Recess 32 also includes an inner or rear wall 40.

Figure 3:
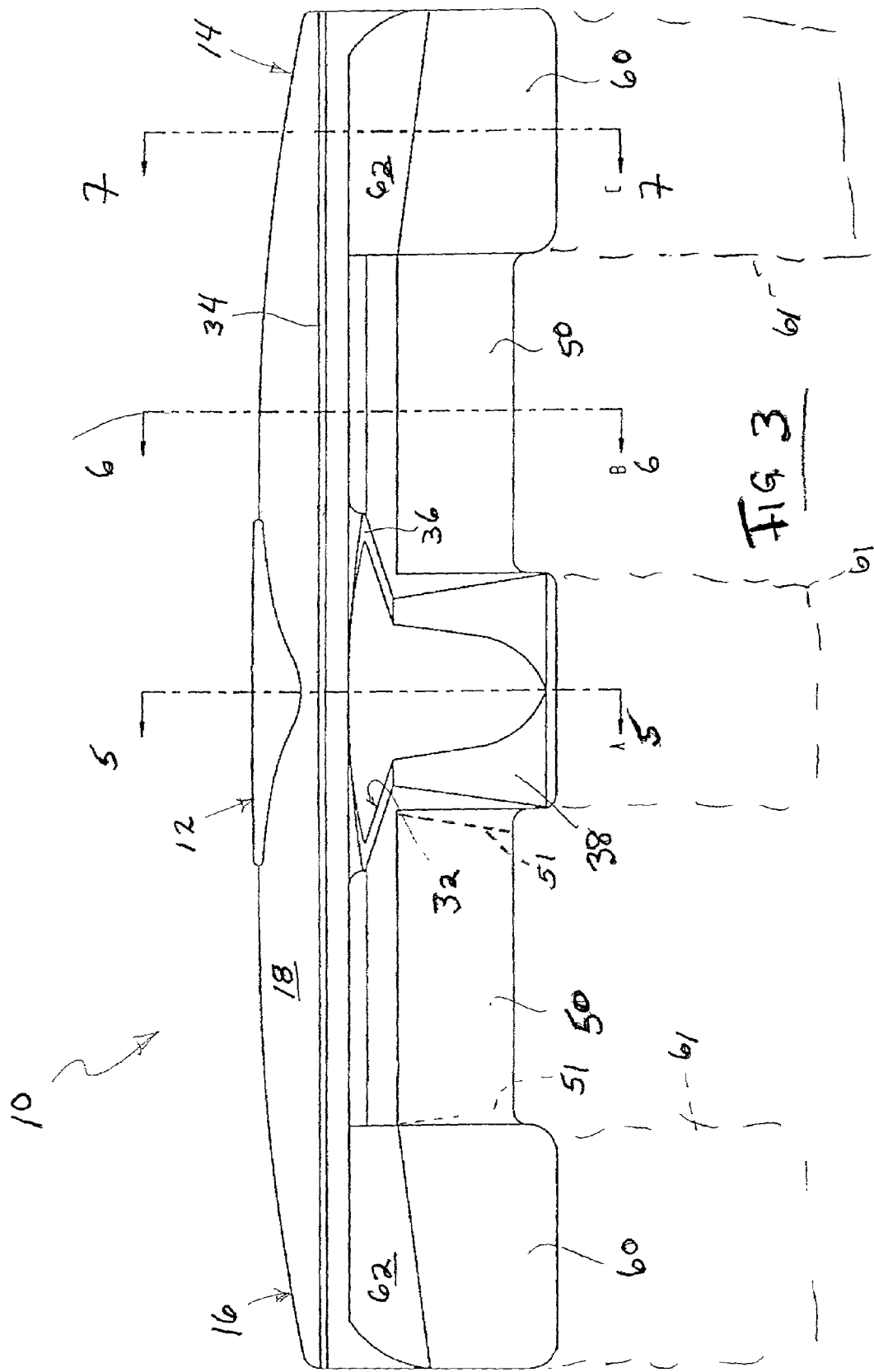
FIG. 3 is a top plan view of the device shown in FIGS. 1 and 2.
Figure 5:
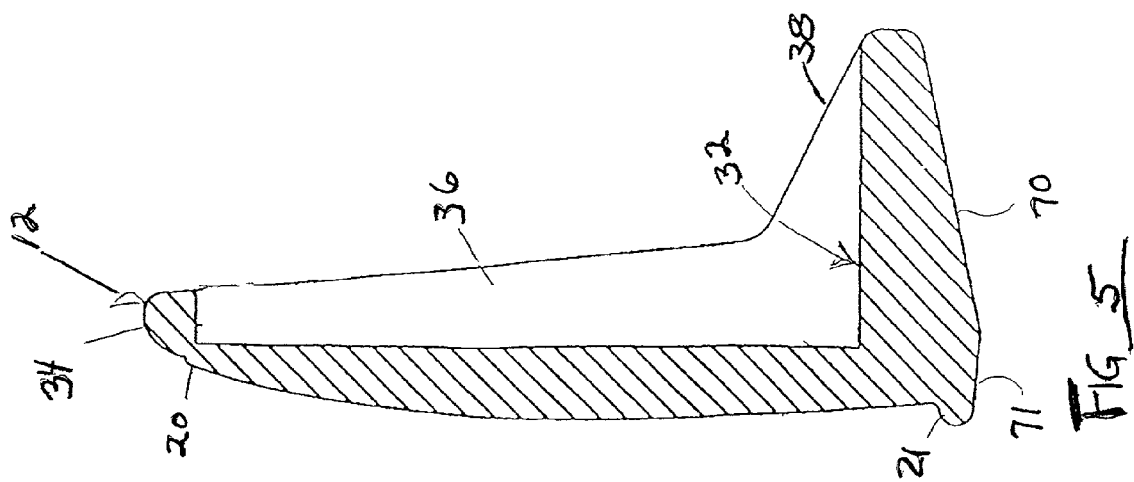
FIG. 5 is a cross-sectional view taken along line 5-5 of FIG. 3.

FIG. 5 is a cross-sectional view taken along line 5-5 of FIG. 3 so as to extend through the central area 12. FIG. 5 shows in greater detail the collar 36 that extends about recess 32 and the transition of the bottom portion into ramp 38. The raised area 20 is also shown as providing additional thickness to the main body between wall 40 and front surface 18. The density and compressibility of central area 12 of the main body is established by a number of factors. Such factors include the thickness and shape of area 20, the density of the material from which the device is molded, the size and shape of recess 32, the size and shape of collar 36 that extends around recess 32, and whether any fabric or covering is used in that central portion of the device.

The central area 12 is designed to be in contact with the seat user's sacrum and to provide the greatest amount of compressibility, and thereby the ability to apply force, relative to the left and right areas, 14 and 16, respectively. In fact, the area directly adjacent the central area 12, that is the area running vertically along and outwardly from the raised area 20, and inboard from left and right areas 14 and 16, will be less compressive than the central area and the left and right areas. Consequently, those adjacent areas and will yield readily as the user sits back against the support device. This allows the skeletal structures adjacent the sacrum to fall back or move rearwardly, as the sacrum is itself supported. This yieldability aspect of the portion adjacent the central area 12 is aided by the stiffening provided by collar 36 that runs along the vertical sides of recess 32, and thus along the rear of raised area 20.

The bottom 70 includes a small sloped front portion 71 in the central area 12, that is positioned at a slight angle relative to the bottom 70, and formed at the base of the raised area 20. The bottom of area 20 can also include an additional protrusion 21 positioned at the base of area 20. This front portion 71 fits against the seat and together with protrusion 21 also provides a compressive force to the sacrum and thereby follows the line of pressure to better fit the sacrum of the person using the device.

Figure 6:
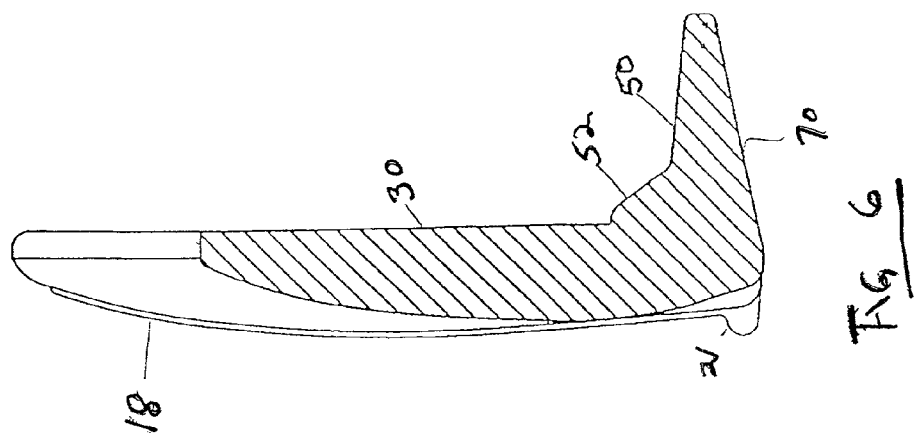
FIG. 6 is a cross-sectional view taken along line 6-6 in FIG. 3.

Turning to FIG. 6, which is a cross-section taken along line 6-6 of FIG. 3, the curvature of front wall 18 continues, while rear wall 30, now some what shorter than the rear wall closer to the central area 12, continues its generally vertical orientation. A sloped wall 52 extends downwardly from the bottom of rear wall 30 and extends into a ramp or flex-gate 50 that is preferably integrally joined with ramp 38 in the central area 12. The flex-gate 50, as shown in FIG. 3, extends laterally for some distance and interconnects with a ramp or angled member 60 positioned at each end of the support device 10. There ramps 60 assist in strengthening each end of the support device 10 and in conjunction with the flex-gates 50 help tune the support device for its desired flexibility. The shaded area in FIGS. 1 and 2 is the area where greater flexibility is built in to the support device. That area has been designed to permit the skeletal structure adjacent the sacrum to fall back toward the seat or be released rearwardly relative to the force or pressure applied by the central area 12 of the support device. Each ramp or flex-gate 50, provided on opposite sides of the central area 12, also provides seat support for the support device 10, it ties together the bottom ends to the central area 12, and stiffens the compressibility of the support device.

With reference to FIG. 3, it might also be desirable to have the rear ramps or flex gates 50 freely movable. This could be accomplished by having each end portion cut away, as for example is shown in dotted line on the left side of FIG. 3 at 51. This way each flex gate 50 would move without being directly connected to ramp 60 or 38, and this would alter the flexibility of the device relative to the seat and the user.

Figure 7:
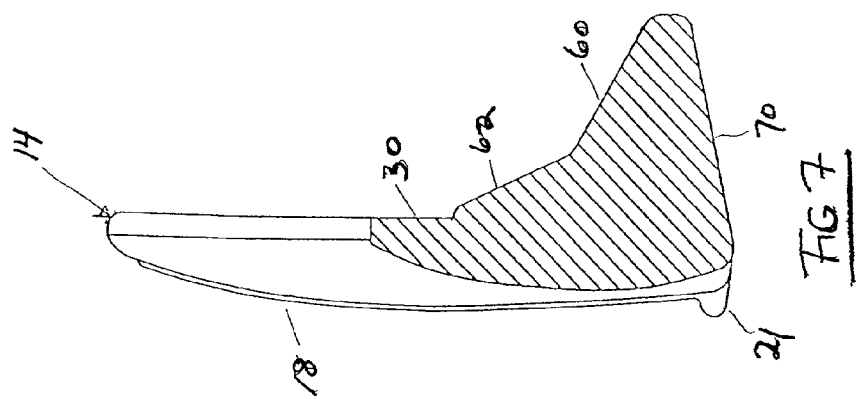
FIG. 7 is a cross-sectional view taken along line 7-7 in FIG. 3.

Since each end of the support device 10 is a mirror image of the other, only end 14 will be described in detail and is shown in FIG. 7 in cross-section. Front wall 18 continues to be curved while the rear wall 30 remains relatively straight even though it is very much shorter than the portion shown in FIG. 6. As shown in FIG. 7, each end includes a relatively large, rearwardly extending ramp 60 with a much larger sloped transition area 62 that joins the bottom of rear surface 30 with ramp 60. The ramps 38 and 60, flex gates 50, and bottom surface 70 collectively form a rearwardly extending support structure that interfits with bottom and rear seat sections. When required, a separate spacer member 130, as shown in FIGS. 14-17 can be employed to fill any extra large gap that may be present in some seat configurations. As discussed below, the front face of spacer 130 is shaped to interfit with the rear face of the support device 10. Spacer 130 includes an insert portion 132, shown in FIG. 14, that fits within recess 32, and a series of shaped and sloped surfaces designed to collectively fit against and support the rear surface 30 and each of the ramps 38 and 60, and the flex gates 50 discussed above. The rear surface 140 of spacer 130, shown in FIGS. 15 and 16, can be smooth or alternatively that surface, or other surfaces, can be covered, roughened, or both, as discussed above.

In addition, ramps or members 60 can also have a tether or streamer device 61, as shown in phantom in FIG. 3, connected to them either by glue, sewing or some other conventional method. Such a tether or streamer device would be useful to assist in securing the support device 10 to the seat and prevent the support device from moving around during use. It should be understood that where any such tether or streamer device is used its length could preferably vary from about one inch to about twelve inches. It would also be possible to employ a tether or streamer device that would permit its being wrapped about some structural seat member, or even about the seat or to a bracket positioned beneath the seat to hold the device in place. The tether or streamer device could also be provided in a serrated or breakable form so that it could be fastened and then broken or cut to the desired final length.

FIGS. 9-11 and 12-13, respectively, show two exemplary inserts designed to fit within the recess 32. Turning next to FIGS. 9-11, the insert, generally shown at 80, includes a front surface 82, a rear surface 84, a rearwardly extending projection 86, defined by a circumferential flange 88, and a bottom 92. The front surface also includes a raised circular area 90, positioned in the upper portion, and a forwardly directed ramp 91 that extends outwardly and downwardly. The rearwardly extending projection 86 is shaped to interfit within recess 32, and in this example has a corresponding egg shape with the larger area located at the top. The thickness of projection 86 will be such that it fills the depth of recess 32 with flange 88 being in contact with the outer surface of collar 36 when the insert is placed within recess 32. Flange 88 also has an angled bottom edge 89 that will lie against the upper surface of ramp 38 when insert 80 is in place. The shape and design of insert 80 can be heavier than the example shown in FIGS. 12 and 13, and will generally provide firmer support or be made denser than that example.

The height of rear surface 84 is approximately 4½ inches and the slope of the flange 89 adjacent the bottom 92 is at an angle of approximately 27 degrees, while the slope of ramp 91 is at an angle of about 26 degrees.

The distance between the top of flange 88 and the top of the rear projection 86 is approximately 0.35 inches. Also, the diameter of the circular outer portion of flange 88, as seen in FIG. 10, is approximately 3 inches, whereas the outer diameter of the raised area 90 is about 2.5 inches.

The rearwardly extending projection 86, as noted above, is designed to fit within the collar 36 of recess 32 and preferably will fit snugly into that recess. The rear surface of flange 88 will contact the front surface of collar 36 and the angle of the flange 88 adjacent bottom 92 is designed to cooperate with the slope of ramp 38 and will be supported thereby. It should also be understood that a variety of techniques could be used to assure that the inserts, for example 80, remain in place as originally inserted. One approach is to use an adhesive, applied to either the insert or on surface 40, that is initially protected with a peel off cover. When the correct insert is found the cover would be peeled off exposing the adhesive to hold the insert in place once inserted. Alternatively, use could be made of Velcro, the rear portion of the insert could be formed to produce a slight compressive fit within recess 32, or a type of snap fit could be employed.

Turning now to FIGS. 12 and 13, a modified insert, generally shown at 100, has a shape corresponding to recess 32 but omits the flange 88. In essence, this insert is similar to the rear projection 84 of insert 80. The front surface 102 also includes a raised projection 104, a bottom 106, a rear surface 108, and an upper end 110. In addition, the lower portion of front surface 102 has a ramped area 112.

Each of the raised areas, 90 and 104, serve to provide more concentrated force or pressure on the upper portion of the sacrum, the location where it is believed such force should be concentrated. These raised areas could also be formed using a denser material or they could be otherwise strengthened, as needed, to provide a desired force. Alternately, the areas 90, 104 and 134 could be formed as a separate insert and were that the case a series of such inserts could be formed with a variety of compressions. By selecting among the various compression range for the primary insert, for example 100, and among the various compressions for an insert 104, a variety of combinations could be developed to thereby better correct a wide range of individual problems and produce the desired effects over a wide range of forces on the user's sacrum.

The overall shape of insert 100 is also designed to fit within the recess 32 so as to be surrounded by collar 36 when inserted. Since this type insert is thinner than the type shown at 80, this type will generally apply less compressive force where lighter pressure is needed.

The support device 10 is preferably molded in an integral fashion from a polyurethane, a polyurethane rubber, or other similar type foam material, including other flexible moldable resins, compression molded, crosslinked polyurethane foam, self skinning foams. The preferred foam is a TC-276 A/B 5 LB self-skinning flexible foam that produces an integral skin and exhibits a 15 lb. Medium density foam. For a firmer, semi-rigid foam 80 parts A to 100 parts B could be used, and for a softer, cushion style foam, 50 parts A to 100 parts B could be used. Examples used a mix of ranges that varied from 40/100 to 80/130 and 70/140, with the latter proving to be the softest and most durable. The inserts preferably have densities that vary from about half of the density of the main body to a density that is several times the density of the main body, for example, about five times.

As a further example, there are preferably four insert densities that preferably have the following lb./cu.ft. density ranges: 1) 10 to 14; 2) 14 to 18; 3) 18 to 22; and 4) 22 to 25. However, other lower and/or higher densities could be used and their exact density selection will depend upon the density selected for the main support device 10.

An additional guide in developing a suitable support device is that the device should provide a pressure on the sacrum of about 2 psi to about 4 psi, with an upper end of the range for a person in vehicle seat being about 10 psi when the vehicle operator is actively driving the vehicle and is using the brake and clutch.

The main body will preferably have a density ranging from about 10 to about 25 lb./cu.ft., measured in accordance with ASTM D1565 standard methods. Compression tests, using ASTM D395—Method B for 70 hours at room temperature, showed compression ranging from about 15% to about 40%. Thus, a variety of densities and compressibilities can be achieved. In addition, inserts 80 and 100 can provide additional harder or stiffer compressibilities that are concentrated in the central area 12. This is accomplished by making the inserts according to a variety of densities, for example, an insert weighing about 15 grams, with a preferred density range of about 11 lb./cu.ft. to 36 grams with a preferred density of about 15 lb./cu.ft. The range could also vary from about 2 lb./cu.ft. to about 30 lb./cu.ft. By producing a plurality of inserts each with a different density, or firmness, one can choose from among the plurality of different compression or force application effects. By using an insert having a lesser density, one type of coordinated or combined compressibility will be achieved, but this can be increased to a fairly stiff and/or hard central area by using an insert, or several inserts, with a higher density within recess 32. Other inserts will, of course, produce other results each of which will have applicability in a variety of circumstances. It should be understood that inserts 80 and 100 should be designed so that while they preferably fit relatively snugly within recess 32, they should also be removable to permit a user to vary between one insert and another. Further, it should be understood that the main body of the support device 10 can be used by itself without any inserts.

It is preferred that the molded product be formed from self-skinning type foam. However, as discussed above, the support device can be coated with a polyester urethane, or similar material, with paint, with a fabric, leather or other covering material.

Figure 14:
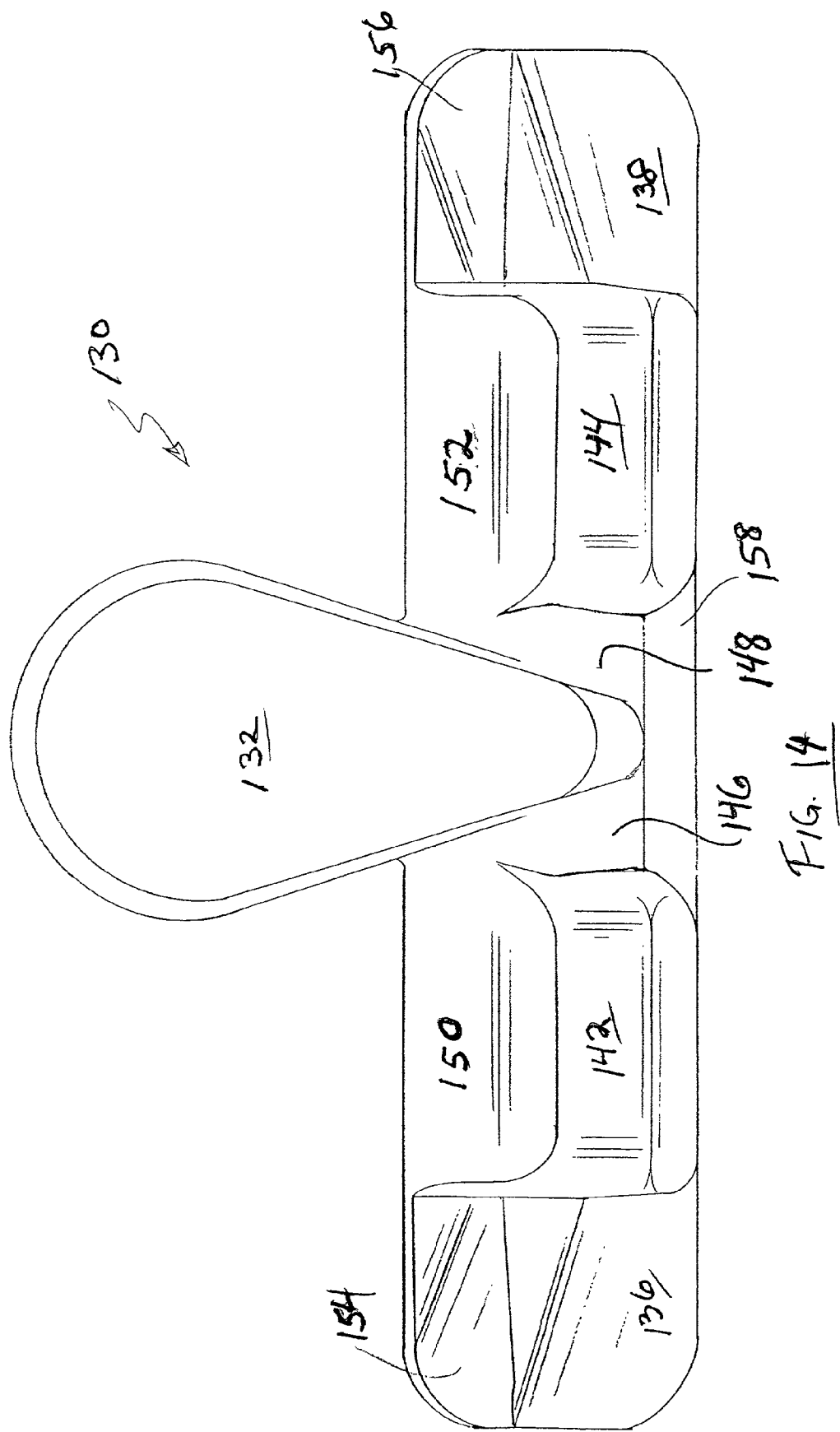
FIG. 14 is a front elevational view of a spacer member that can be used with the present invention.
Figure 15:
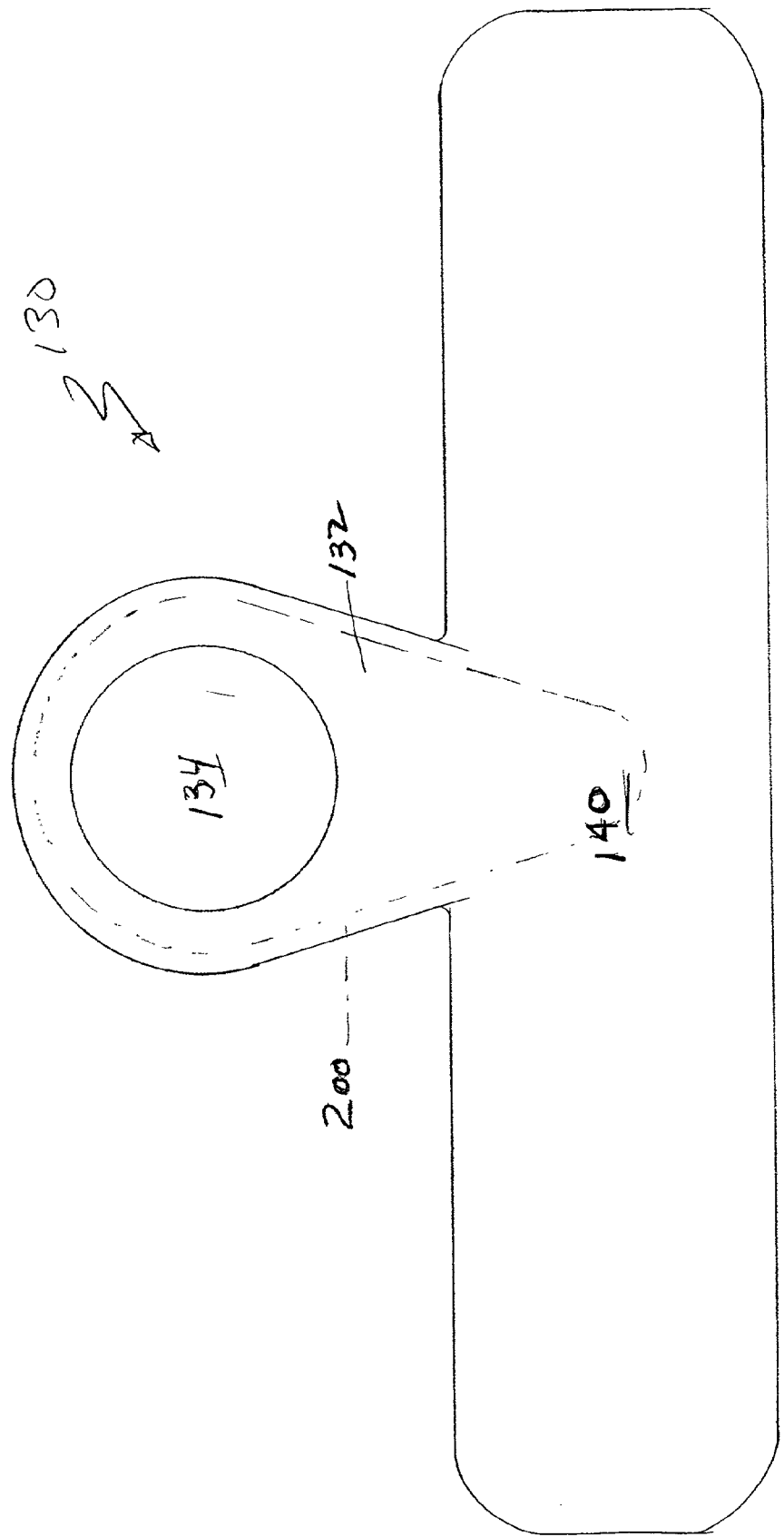
FIG. 15 is a rear elevational view of FIG. 14.
Figure 16:
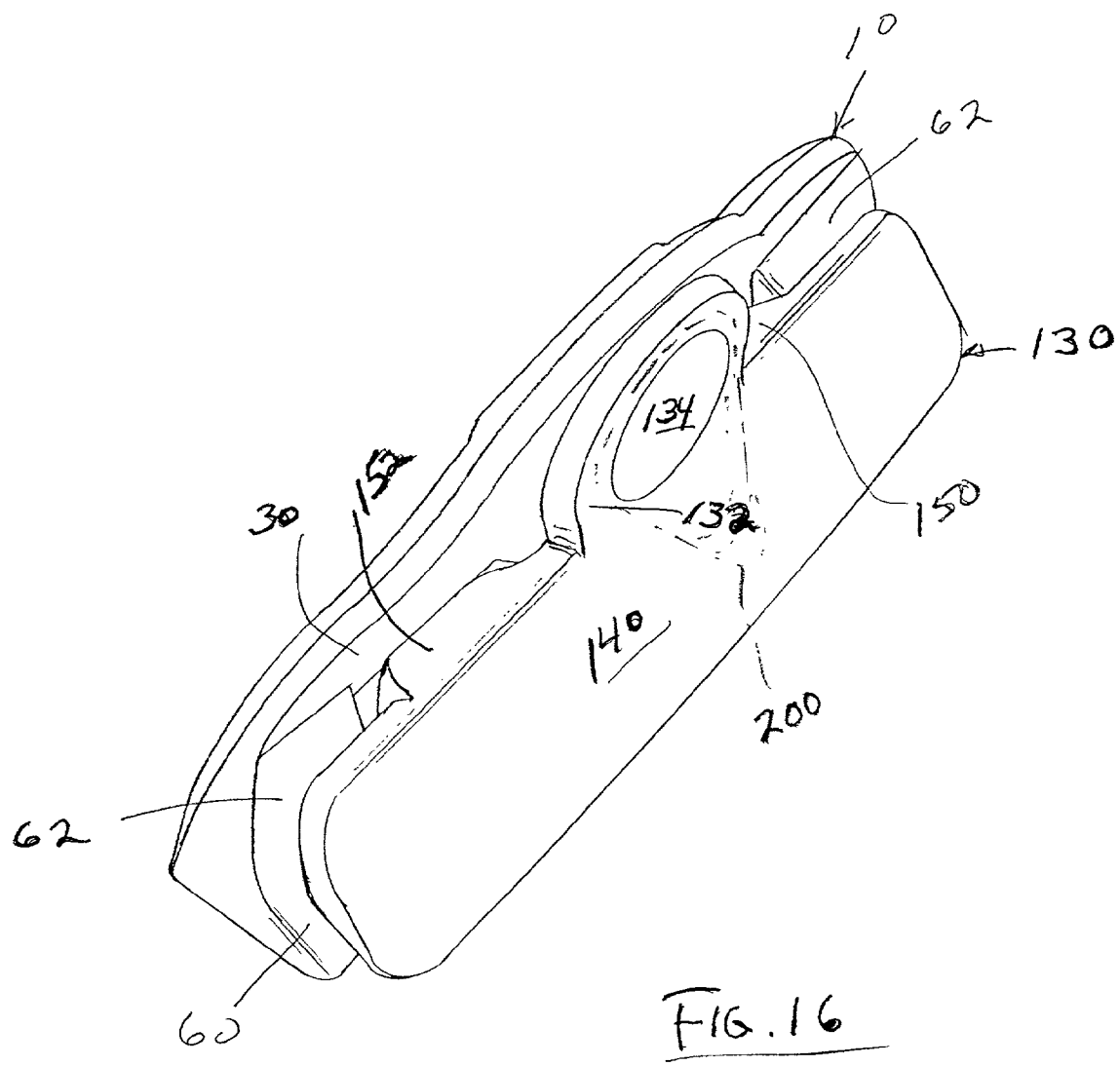
FIG. 16 is an overhead perspective view of the present invention including the spacer member shown in FIGS. 14 and 15.
Figure 17:
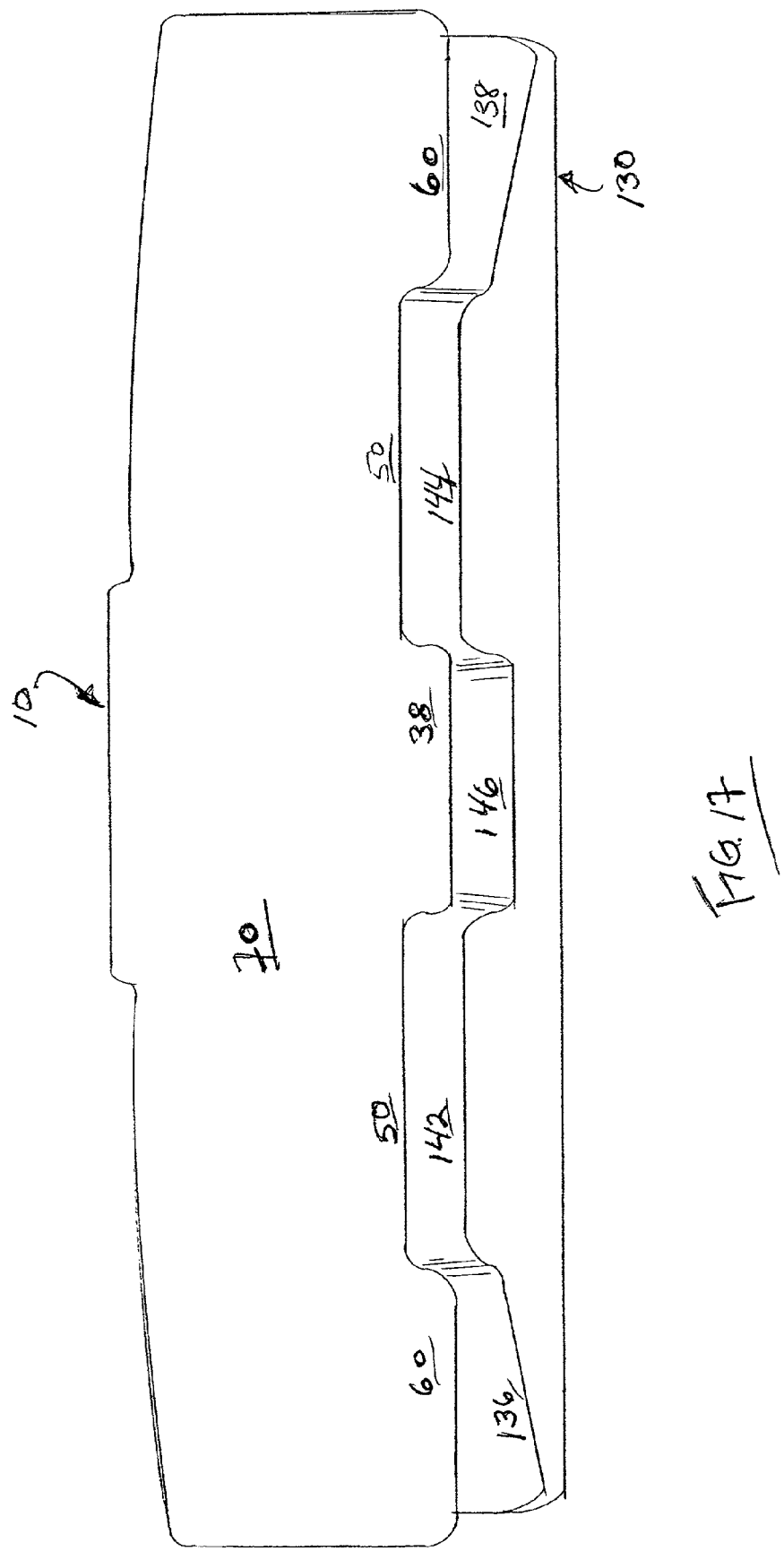
FIG. 17 is a bottom plan view of FIG. 16.

The spacer 130, as shown in FIGS. 14-17, can be used when one wishes to use the present invention in an especially deep seat or where there is some space at the rear of the seat that will not be correctly filled by the device 10. In such a situation, spacer 130 can be used in conjunction with device 10. Spacer 130 will be formed in the same fashion as the main body and is molded with an integral insert 132, as shown in FIG. 14, and from the rear insert 132 can be seen as including a raised projection 134 that provides additional thickness and compression. The front area of spacer 130 includes end slope areas, 136 and 138, respectively, that mesh or interfit with ramps 60. Inboard from these end slope areas are projections 142 and 144, respectively, that mesh with the flex-gates 50 located on each side of center. Another sloped area is provided on each side of the insert 132, those sloped areas being shown at 146 and 148, respectively. There is a ledge or upper surface 150 and 152 provided at the top of projections 142 and 144. There can also be a narrow recessed area 158 located below and extending both sloped areas 146 and 148.

With continued reference to FIGS. 14-17, it is also possible to employ the insert approach with the spacer 130. To accomplish this, the area 132 which shows an insert could itself include a recess, similar to 32 as shown in FIGS. 2 and 3. Such a recess is shown in phantom at 200 in FIGS. 15 and 16. In such a case, another series of inserts like those shown at 80 and 100 could be used as well directly within recess 200 in spacer 130. This, it would be possible to use the device 10 with an insert within recess 32, the spacer 130 and another insert within recess 200, or any combination thereof. It would also be within the scope of this invention to manufacture the spacer 130 from a series of varying densities and then to select the appropriate spacer to not only accomplish the spacing task but to also produce the desires compression and thereby the needed force against the sacrum to orient the spine.

It should also be understood that each of the insert members described above, for example 80 and 100, could be made to each receive a variety of shaped inserts such as is shown in phantom at 94 and 96 in FIG. 10. Such inserts could also be made with a series of densities or compressibilities so that a plurality of these inserts would permit a wide variety of compression effects to be achieved.

While the present invention has been described in connection with what are presently considered to be the most practical and preferred embodiments, it is to be understood that the invention is not to be limited to the disclosed embodiments, but on the contrary, is intended to cover various modifications and equivalent arrangements as can be included within the spirit and scope of the appended claims.

What is claimed is:

1. A portable sacral support, comprising:
 a main body having a bottom, a central portion, adjacent side portions, and a rear surface, the rear surface comprising:
   a plurality of spaced apart ramps and recesses that collectively provide compressive support at the central portion of the main body that is focused upon the sacrum and lesser compression in a release area located adjacent each side of that central portion that applies less force on muscles adjacent the sacrum, wherein said central portion includes a recess and said support further includes one or more inserts of varying levels of compressibility that can fit into said recess and which is additive to the compressibility of said central portion when positioned within said recess.

2. The sacral support as in claim 1 wherein said inserts have an inverted tear drop shape.

3. The sacral support as in claim 1 wherein said inserts have a ramp member positioned adjacent a bottom portion.

4. The sacral support of claim 1 wherein said inserts have density values ranging from about 2 lb./cu.ft. to about 30 lb./cu.ft.

5. The sacral support of claim 1 wherein said inserts have density values ranging from about 10 lb./cu.ft. to about 25 lb./cu.ft.

6. The sacral support of claim 1 wherein the central portion has a compressibility level that produces from about 2 psi to about 4 psi on the sacrum of the support user.

7. A portable sacral support for use along the area where a seat bottom and seat back meet, comprising: a main body having, a central portion, adjacent side portions directly adjacent the central portion and end portions located outwardly from the adjacent side portions, said main body having a plurality of compression areas, a first compression area having a first and greatest compression value and being centrally positioned to provide controlled force against a support user's sacrum, a second compression having a compression value less than said first compression value and comprising the adjacent side portions adjacent each side of said first compression area, and a third compression area at the end portions having a compression value between that of said first and second compression areas.

8. A portable sacrum support as in claim 7 wherein said sacral support provides a force of about 2 psi to about 4 psi on the sacrum of the support user.

9. A portable sacral support for supporting the sacrum of a user seated in a seat with said support positioned in front of the back of the seat and behind the user sacrum, said support comprising a main body having first, second and third compression areas at separate locations along the length of the support, said first compression area being centrally positioned on the support to provide a first amount of compression to thereby provide a controlled amount of force against a support user's sacrum when the user is in the seat, said second compression area being positioned adjacent each side of the first compression area and having less compression than said first compression area, said third compression area being positioned outwardly of each of the second compression areas and having an amount of compression between that of said first and second compression areas.

10. A portable sacral support positioned along an area where a seat back and a seat bottom meet, comprising:
 a main body having, a central portion and adjacent side portions,
 a plurality of compressive support areas, one having a first compression value located at the central portion of the main body that is focused upon the sacrum and lesser compression areas having compression values less than the first compression value located adjacent each side of the central portion, wherein said central portion includes a rearwardly facing recess and at least one insert member that interfits within said recess.

11. The sacral support of claim 10 further including a spacer member that interfits with said main body to provide an extension thereof so that sacral support can be provided where more space must be accommodated in the area between the seat back and seat bottom.

12. A portable sacral support positioned along an area where a seat back and a seat bottom meet, comprising:
 a main body having a central portion and adjacent side portions,
 a plurality of compressive support areas, a first compressive support area having a first compression value located at the central portion of the main body that is focused upon the sacrum and second and third lesser compression areas with compression values less than the first compression value located adjacent each side of the central portion,
 further including end portions that extend beyond said adjacent side portions and provide additional support and aid in forming a release area adjacent each side of the central portion, and a bottom area and wherein a flex gate is provided adjacent said bottom area between said central portion and each of said end portions portion.

13. A portable sacrum support for supporting the sacrum of a user seated in a seat with said support positioned in front of a seat back and behind the user sacrum, said support comprising: a main body having front and rear surfaces, a bottom, a central portion, an adjacent side portion on each side of the central portion that collectively provide compressive support, the central portion having a first level of compression, each adjacent side portion comprising an area of lesser compressive support thereby forming a release area adjacent the central portion where less compressive force is applied to muscles adjacent the sacrum than is applied in the central portion, and wherein the central portion further includes a recess and a plurality of insert members that can be received in the recess, each insert having a different compression value.

14. A portable sacral support for use along the area where a seat bottom and seat back meet, comprising: a main body having,
 a central portion and end portions, said main body having first and second compression areas, said first compression area having a first compression value in the central portion to provide controlled force against a support user's sacrum, said second compression area having a compression value less than said first compression value and being positioned adjacent each side of said first compression area, and further including a third compression area located adjacent each end portion and having a compression value between that of said first and second compression values.

15. A portable sacrum support for supporting the sacrum and controlling the spine of a user seated in a seat with the support positioned in front of the back of seat and behind the user sacrum, said support comprising: a wedge shaped main body having front and rear surfaces, a bottom, a central portion, an adjacent side portion positioned on each side of the central portion that collectively provide resistive support, and an end portion located outwardly from each of the adjacent side portions, the central portion having a first and greater amount of resistance than is provided in adjacent side portions where each exhibits an area of lesser resistance and support thereby defining a release area so that less resistance exists against areas adjacent the sacrum than is applied to the sacrum by the central portion thereby permitting body structures adjacent the sacrum to nest rearwardly into the adjacent side portions as the sacrum is supported more forwardly.

16. A removable support for an automobile seat having a seat back area and a seat bottom area, comprising:
 a wedge of pliable material having a base portion integrally formed with a riser portion;
 the base portion having a base surface to sit on at least a portion of the seat bottom area;
 the riser portion having a face surface extending upward from the base portion at an acute angle relative to the base surface, the riser portion having a back surface resting against at least a portion of the seat back area, the riser portion also having a central volume between a first portion of the face surface and a first portion of back surface, the riser portion also having two side volumes between, respectively, second and third portions of the face surface and second and third portions of the back surface, where the first portion of the face surface is between the second and third portions of the face surface, and where the first portion of the back surface is between the second and third surfaces of the back surface, the central volume also being of pliable material having a first characteristic compression coefficient and the side volumes being of pliable material having a second characteristic compression coefficient less resistant to compression than the first characteristic compression coefficient; and
 wherein, the two side volumes and the central volume are arranged in the riser portion such that, when a user is seated on the removable support in the automobile seat, the two side volumes are essentially aligned with the user's ilia(s) and the central volume is essentially aligned with the user' sacrum.

17. The removable support as in claim 16, wherein the base portion further includes an edge portion on the rear thereof for insertion into a space between the seat back area and the seat bottom area.

18. The removable support as in claim 16, wherein the face surface includes a raised area in the area of the central volume.

19. The removable support as in claim 16, wherein the support is molded in one piece and includes a first and higher density foam central volume and a lower density foam in each of the two side volumes.

20. The removable support as in claim 16, wherein the central volume has a greater thickness than the two side volumes.

21. The removable support as in claim 16, wherein at least the base surface includes a slip resistant treatment.

22. The sacral support of claim 16 further including a spacer member that interfits with said removable support to provide an extension thereof so that sacral support can be provided where more space must be accommodated in the area between the seat back area and seat bottom area.

23. A portable sacral support positioned along an area where a seat back and a seat bottom meet, comprising:
    a main body having a central portion and adjacent side portions,
    a plurality of compressive support areas, one having a first compression value located at the central portion of the main body that is focused upon the sacrum and lesser compression areas with compression values less than in the central position located directly adjacent each side of the central portion, and said central portion further includes a rearwardly facing recess and at least one insert member that interfits within said recess.

24. The sacral support of claim 23 wherein said support further includes a plurality of additional inserts, each having a different level of compressibility that can fit into said recess and which is additive to the compressibility of said central portion when the insert is positioned within said recess.

25. A portable sacral support positioned along an area where a seat back and a seat bottom meet, comprising:
    a main body having a central portion and adjacent side portions,
    a plurality of compressive support areas, one having a first compression value located at the central portion of the main body that is focused upon the sacrum and lesser compression areas with compression values less than in the central position located directly adjacent each side of the central portion, said main body further includes end portions that extend beyond said adjacent side portions and provide additional support and aid in forming a release area adjacent each side of the central portion, a bottom area, and a flex gate provided adjacent said bottom area between said central portion and each of said end portions.

26. The sacral support of claim 25 wherein said flex gate is at least, in part, unconnected to said main body.

27. A portable sacrum support for supporting the sacrum of a user seated in a seat with said support positioned in front of the back of seat and behind the user sacrum, said support comprising a main body having front and rear surfaces, a bottom, a central portion, and an adjacent side portion on each side of the central portion that collectively provide compressive support and an end portion located outwardly from each of the adjacent side portions, the central portion having a first level of compression, and areas of lesser compressive support in a release area located in each of the two adjacent side portions where less force is applied to muscles adjacent the sacrum, the central portion further includes a recess and a plurality of insert members each of which can be separately received in the recess with each insert providing a different compression value for the central portion.

28. A portable sacrum support as in claim 27 wherein at least one of said plurality of insert members has a plurality of compression values.

29. A portable sacral support for use along the area where a seat bottom and seat back meet, comprising: a main body having a central portion and end portions at opposing ends of the main body, said main body having first and second compression areas, said first compression area having a first compression value in the central portion to provide controlled force against a support user's sacrum, said second compression area located between each side of the central portion and respective end portions, said second compression area having a compression value less than said first compression value, said main body further including a third compression area located adjacent each end portion and having a compression value between that of said first and second compression values.

30. The portable sacrum support as in claim 29 wherein the central portion applies concentrated pressure on the sacrum while portions adjacent each side of the sacrum are nestled in the release areas.

31. The sacral support of claim 29 further including a spacer member that interfits with said wedge shaped device to provide an extension thereof so that sacral support can be provided where more space must be accommodated in the area between a seat back and a seat bottom.

\* \* \* \* \*